United States Patent [19]

Young

[11] 4,099,700
[45] Jul. 11, 1978

[54] FLOW CONTROL DEVICE FOR FLUIDS FLOWING IN A CLOSED CONDUIT

[76] Inventor: Wen Young, 20228 Valerio, Canoga Park, Calif. 91306

[21] Appl. No.: 769,181

[22] Filed: Feb. 16, 1977

[51] Int. Cl.² ............................................. F16L 55/44
[52] U.S. Cl. ....................................... 251/7; 251/133
[58] Field of Search ................................... 251/7, 133

[56] References Cited

U.S. PATENT DOCUMENTS

| 2,313,550 | 3/1943 | Huber | 251/7 |
| 2,660,395 | 11/1953 | Mair | 251/7 X |

Primary Examiner—Harold W. Weakley
Attorney, Agent, or Firm—Julian J. Schamus

[57] ABSTRACT

A flow control device incorporates a flow sensor and a flow control circuit responsive to the output signal of the flow sensor. The flow control circuit operates, via a servo, a flow control valve. The flow sensor incorporates a self-heated thermistor located in the divergent discharge throat of a nozzle in the flow stream. Two unheated thermistors are also located in the fluid, at arbitrary points distant from the nozzle, and incorporated in the control circuit for temperature compensation. The valve controls the flow of fluids therethrough by the distention of an integral seal tube into a cavity formed in an anvil inset into the seal tube. The cavity is conical in shape and the elastomeric seal tube is pressed thereinto by means of a ball. Two orifices issue into the cavity and terminate in the flow channel at the upstream and downstream ends of the valve. With the ball at the inmost limit of its travel, the seal tube blocks the exits of both orifices into the cavity and prevents flow in the channel.

6 Claims, 4 Drawing Figures

FLOW CONTROL DEVICE FOR FLUIDS FLOWING IN A CLOSED CONDUIT

BACKGROUND OF THE INVENTION

The invention relates to flow control devices. It relates, more particularly, to flow control devices in which a valve is operated by servo means responsive to a mass flow signal derived from a flow sensor.

The prior art in the field of fluid flow control is extensive and relates to both flow sensors — devices for measuring the rate of fluid flow in a channel — and control valves — devices for altering the rate of flow in a given channel by varying the resistance in the path of such flow. The prior art has also taught the construction of control circuits capable of operating control valves in response to signals derived from flow sensors and compared to signals representing the desired rate of flow.

One common difficulty with control valves of the prior art relates to their incorporation of seals preventing the agress of the fluid from the internal volumes of the valve to the atmosphere. Such seals are commonly associated with the valve operators which penetrate the valve body.

The novel control valve disclosed herein uses no sliding or rotating seals, and the operating member does not penetrate into spaces occupied by the controlled fluid. The flow coefficient of the valve is varied by compressing a ball against a core assembly consisting of a length of elastomeric tubing and a solid anvil. Friction is minimized in the control valve of the invention and the torque required to operate is reduced considerably, with respect to designs of the prior art.

The invention also encompasses a flow sensor of improved design. The prior art has taught the use of a self-heating thermo-electric element, located at some selected position in the flow stream, for the measurement of mass flow inside a conduit, and compensation for temperature variations by the use of additional thermoelectric elements located at some other selected positions inside the conduit. In the flow sensor of the invention the accuracy, reproducibility and sensitivity of the device has been improved significantly by the following features: (a) measurement of the mass flow rate is facilitated by interacting a self-heating thermo-electric sensor with a hydrodynamically focused fluid stream, and (b) compensation for changes in the ambient temperature is facilitated by using two passive thermal elements which may be located anywhere in the flow conduit, except in the immediate vacinity of the focused stream.

It is, therefore, a primary object of the invention to provide a flow control valve in which the actuating elements are sealed from the fluid within the valve by stationary seals not exposed to motion, either reciprocating or rotary.

It is a further object of the invention to provide a novel flow sensor, and associated electrical circuitry, which minimizes influences which would degrade the performance of the sensor, and which permit ready and simple compensation for temperature variations in the fluid stream.

It is yet another object of the invention to provide a flow control device integrating a novel flow sensor and a novel flow control valve with a control circuit particularly adapted to both.

SUMMARY OF THE INVENTION

The above objects, and other objects and advantages which shall become apparent from the detailed description of the preferred embodiment thereof, are attained in a flow control device comprising a flow sensor, a bridge circuit of which the flow sensor forms part, detector and amplifying circuits and a novel flow control valve operated by a servomotor.

The flow sensor of the invention employs a nozzle plate pierced by a flow-accelerating nozzle with a divergent exit channel. The nozzle plate is manufactured from a material with a low thermal conductivity and is installed in the fluid conduit at a suitable location. Immediately downstream of the throat of the nozzle, in the divergent exit channel, a self-heating thermally sensitive electrical resistance element is installed. This element is suitably a thermistor in which the resistance to an imposed current is strongly affected by the temperature of the resistor body.

The thermally sensitive element is heated by a relatively large current passing through it, and cooled by the forced convection of the fluid jet issuing from the throat of the nozzle. The temperature of the element will be materially affected by even small changes in the stream velocity, through the influence of the latter on the convective heat transfer coefficient. The use of a thermally insulating nozzle plate tends to reduce heat flow from the thermally sensitive resistance element to bodies other than the fluid, so that the response to changes in fluid velocity in the channel is substantially instantaneous.

The thermistor, or other temperature-responsive resistor, at the nozzle exit is the primary flow sensor and is made part of a sensing circuit, substantially equivalent to a Wheatstone bridge. The primary sensing element forms one leg, or branch, of the bridge, with a second temperature-sensitive element in another branch. The other two branches are formed by ordinary resistors. The second thermistor, or like, is also placed in the stream, but in a portion — arbitrarily selected — in which the fluid velocity is not artificially accelerated. The second thermistor is utilized to provide temperature compensation to the primary flow sensor, in a manner more clearly detailed below.

The measurement bridge is balanced at no flow and is powered from a direct current source, such as a battery or an equivalent electric circuit. A detector circuit is also connected across the bridge, in a manner well-known in the art, and is subjected to an unbalanced signal whenever the flow conditions vary from the static. The magnitude of the unbalanced signal being, substantially, a linear analog of the mass flow rate in the conduit.

The detector circuit may also, by preference, include a third temperature-sensitive resistor in the conduit, to allow for accurate modulation of the unbalanced signal from the bridge, and the removal of any tendency to variation in that signal with changes in the fluid ambient temperature.

The detector circuit will commonly include an amplifier which, in turn, provides the sensor output signal to one terminal of a final, or power, amplifier. The other terminal of the output amplifier is supplied with a reference voltage, representing the equivalent of the mass flow rate at which the flow is to be controlled.

The final amplifier determines the difference between the signals representing the desired and existing flow rates and transmits an output signal corresponding to that difference to a servo which modulates the flow through the control valve.

The control valve of the invention comprises a valve body with a cylindrical bore therethrough. The bore is made part of the fluid channel by means of suitable connectors. A core assembly comprising a cylindrical anvil inset into a flexible, elastomeric seal tube is inserted into the bore of the valve body, and the anvil and seal tube are secured in place by means of retainers. The several components are so dimensioned that the seal tube effectively seals the ends of the bore against leakage.

The valve body is also provided with a lateral orifice which exposes a portion of the outer circumference of the seal tube. Underlying this portion of the seal tube the anvil is provided with a cavity, suitably an inwardly narrowing cone. Two orifices, leading to either extremity of the cylindrical bore in the valve body, terminate in the sidewalls of the aforementioned cavity in such a manner that when a ball is pressed against the exposed surface of the seal tube via the lateral orifice, the material of the seal tube is distended and pressed against the mouths of the orifices where they issue into the cavity. In this manner the orifices may be partly, or completely, blocked by the seal tube, depending on the extent of the movement of the ball in the lateral orifice.

The position of the ball is determined by a servo in response to the output signal of the control circuitry. When the flow rate sensed by the primary sensing element is higher than the reference value, the ball is advanced inwardly into the anvil cavity, thereby reducing the flow through the fluid channel. When the flow is found to be less than desired, the ball is allowed to retract — the inherent resilience of the flexible seal tube provides the actual expelling force — from the cavity, increasing the flow coefficient of the control valve and, consequently, the flow of fluid in the system.

BRIEF DESCRIPTION OF THE ACCOMPANYING DRAWINGS

The preferred embodiment of the invention will be described below with reference to the accompanying drawings, in which.

DESCRIPTION OF THE PREFERRED EMBODIMENT

Figure 1:
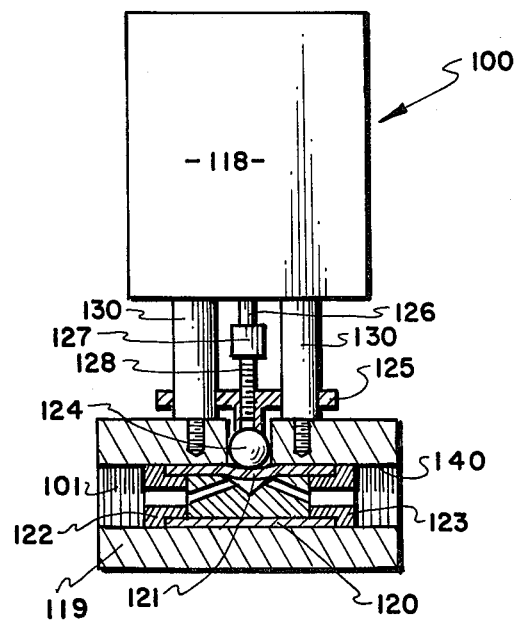
FIG. 1 is a lateral section through the flow control valve of the invention.

A flow control valve 100 of the intention is shown in the transverse, sectional view of FIG. 1. The valve 100 includes a servo-motor 118 secured to a valve body 119. The motor 118 and the body 119 are held in a spaced-apart relationship by rigid, cylindrical guide bars 130, affixed to both the servo-motor housing and the valve body. The guides 130 perform the dual function of defining a reciprocating path for a platen 125, engaged upon the guides by means of suitable orifices, and of mounting the servo-motor to the valve proper.

The valve body 119 is perforated by a cylindrical bore 101 orthogonal to the axis of shaft 126 of the motor 118. A seal tube 121 and an anvil 120 are fitted into the bore 101 coaxially. The seal tube and anvil form a mutually sealing assembly within the bore 101 and are centrally positioned therein by retainers 122 and 123. Another orifice 144 perforates the wall of the valve body, aligned with the axis of shaft 126 and terminating in the bore 101. The orifice 144 serves as guide for a spherical ball 124.

The anvil 120 is defined by a cylindrical core and by a substantially conical recess 150 whose axis of generation coincides with the axis of the orifice 144. The dimensions of the recess 150 and of the ball 124 are so selected that, upon the inward displacement of the ball 124 into the recess, with the wall of the flexible seal tube 121 entrapped between them, the seal tube is compressed against the inner periphery of the recess along a circumferential band. Two orifices 151 and 152 issue into the recess 150 and in the same circumferential band and connect the cavity with either extremity of the bore 101.

The seal tube 121 is constructed from an elastomer, a natural or synthetic rubber, and its thickness and resilience are such that, upon the removal of an external force pressing the ball 124 into the cavity 150, the tube will resume its original tubular form and lift the ball upward into the confines of the orifice 144. With the seal tube relaxing towards its natural, tubular condition, the orifices 151 and 152 are, at least partly, unsealed and flow through the valve made possible. The position of the control elements illustrated in FIG. 1, corresponds to a fully open valve, with no restriction placed in the path of fluid flow.

Figure 1A:
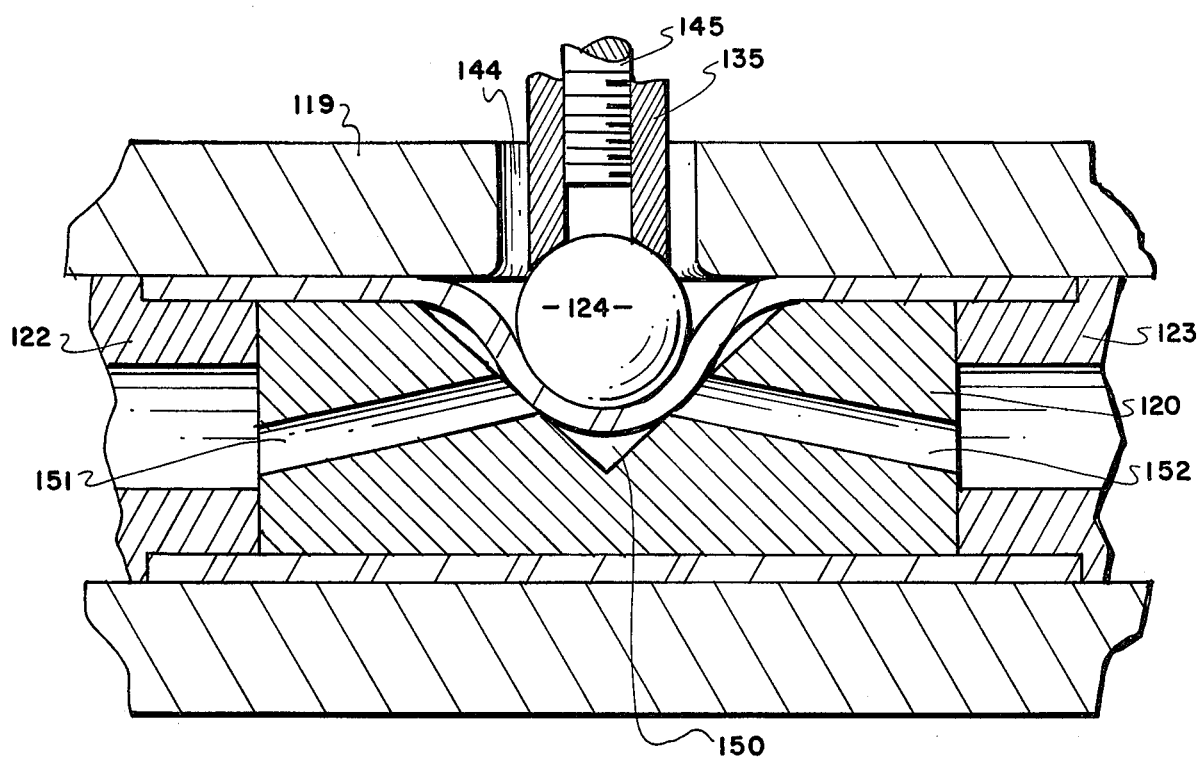
FIG. 1a is a partial lateral section through the valve of FIG. 1, with the several components thereof in the closed position, interdicting flow through the valve.

FIG. 1a is a partial, sectional view of the embodiment of FIG. 1, showing the control elements therein in greater detail. In FIG. 1a the valve is fully closed and no flow is possible across the cavity 150, between orifices 151 and 152.

The position of the ball 124 is controlled by means of the servomotor 118, a reversible electrical motor with an integral speed-reducing gearbox. The output shaft 126 of the motor 118 is adjoined by a threaded shaft portion 128 secured to the shaft 126 by a coupling 127. The platen 125 is provided with a downwardly projecting bushing 135, aligned with the shaft 126, provided with an internal thread 145 matingly engaged upon the shaft portion 128. With the motion of the platen 125 restricted to a reciprocating path by the guides 130, rotational motion of the motor output shaft 126 is translated into a traverse of the platen, and of the bushing 135 integral therewith, in the orifice 144.

The lower edge of the bushing 135 forms a socket for engagement of the upper surface of the ball 124. It should be noted that the terms 'upper' and 'lower' hereinabove refer to the valve position illustrated in FIGS. 1 and 1a; the position of the ball 124 is defined only by the location of the bushing 135 and the resilience of the seal tube 121, so that the valve of the invention is readily employed in any desired alignment.

The ends 140 of the through orifice in the valve body 119 are threaded and the outer peripheries of retainers 122 and 123 bear mating threads and are assembled and positioned with the assitance thereof. The threaded portions 140 also serve to receive the segments of a flow channel 301; either directly, or by interposition of bushings carrying suitable fittings or fastening means.

Figures 2, 3:
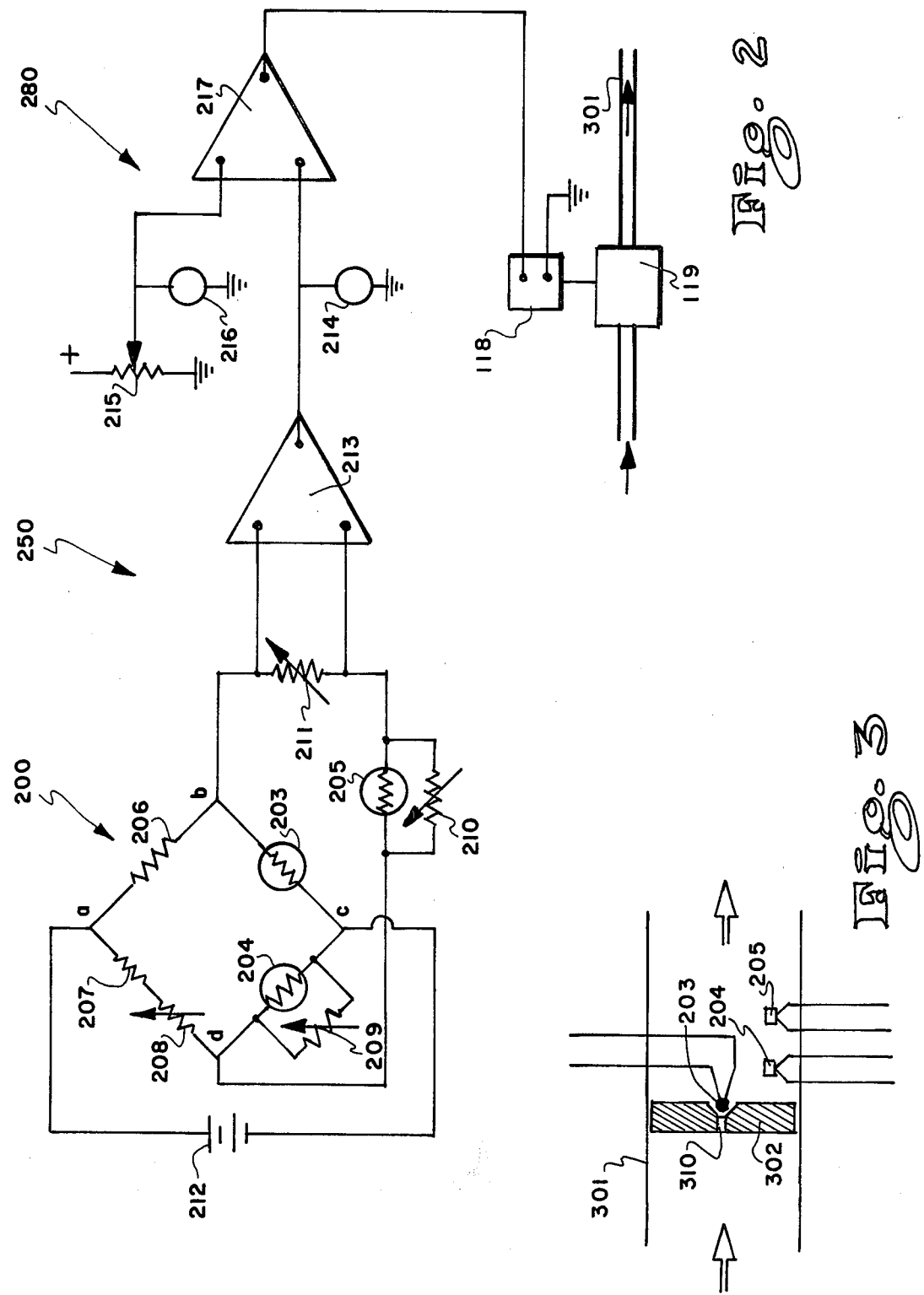
FIG. 2 is a schematic diagram of the control circuit of the invention, incorporating a flow sensor and a control valve.
FIG. 3 is a latral section through the flow sensing station of the control system of the invention, partly schematic in nature, showing the arrangement of the flow sensor therein.

The servomotor 118 is suitably driven by means of an error signal generated by a mass-flow sensing circuit, such as is illustrated in the schematic diagram of FIG. 2. The circuit of FIG. 2, in turn, receives a primary flow signal from a flow sensor shown in the partially schematic illustration of FIG. 3.

Turning to FIG. 3, we observe a sectioned portion of a flow channel 301 which is obstructed by a nozzle plate 302. A nozzle 310, with a divergent exit channel, is provided in the nozzle plate 302 and a primary flow sensing element 203 is mounted within the divergent portion of the nozzle 310. To measure the flow at higher flow rates it may be desirable to provide the plate 302 with one or more additional nozzles 310 not associated with a thermistor. In this way the maximum flow is increased, but the flow rate can still be measured by the effect on the thermistor 203 of the flow through the nozzle 310.

The flow sensing element 203 is thermally sensitive and self-heating, by the passage therethrough of an electric current derived from a bridge circuit 200, to be described in greater detail with reference to FIG. 2. The element 203 is suitably an electrical resistor with a high thermal coefficient, and, preferably, a thermistor. The element 203 is located within the discharge jet of the nozzle 210, ensuring good heat transfer by forced convection and quick thermal response to variations in the total temperature of the fluid stream issuing from the nozzle.

The nozzle plate 302 is preferably made from a material with a low thermal conductivity to minimize the mutual heat flow between the flow sensing element 203 and its surroundings. Since the element 203 is proximate only to the nozzle plate, and since the location of the sensing element within the divergent portion of the nozzle exit channel ensures that radiant heat transfer to other bodies — including the walls of the channel 301 — is relatively low, the response of the element 203 to changes in the stream total temperature is substantially instantaneous and is not materially affected by transient heat transfer to its environment.

Also visible in FIG. 3 are two temperature-sensitive electrical resistors 204 and 205, which may also be suitably selected from the class of circuit components known as thermistors. The elements 204 and 205 are utilized to make the mass flow sensing circuit output independent of variations in the static temperature of the flow stream; consequently they may be located anywhere in the flow channel 301 where the flow velocity is substantially slower than in the jet issuing from the nozzle 210.

The schematic diagram of FIG. 2 encompasses three distinct electrical circuits, a bridge circuit 200, a detector circuit 250, and an output signal generator circuit 280.

The bridge circuit 200 is powered by a source 212 of direct current, connected to input nodes (a) and (c) of the resistance bridge defined by elements 203 and 204, in conjunction with resistors 206, 207, 208, and 209. The detector circuit 250 is connected to nodes (b) and (d) of the bridge.

The detector circuit will be subjected to an input signal only if the bridge is unbalanced; conversely, no signal will be provided to the detector 250 with the following impedance equation satisfied:

$$\frac{R(a-d)}{R(a-d) + R(d-c)} = \frac{R(a-b)}{R(a-b) + R(b-c)}.$$

As long as the above identity is satisfied the individual impedances of the brances (adc) and (abc) may be different. Advantage is taken of this property of the bridge circuit by making the total impedance of the branch incorporating the primary sensing element 203 much lower than that of the branch incorporating the temperature compensating element 204, thereby providing a substantial flow of current through the former — for purposes of self heating — and a much lower flow of current through the element 204. This is advantageous; since the sole function of the element 205 is to respond to changes in the ambient static temperature of the fluid flowing in channel 301, any self-heating tendency of this component would tend to reduce the sensitivity of its response.

With the nominal impedances of several components of the bridge chosen in such a manner that $R(ad):R(ab)$, and $R(dc):R(bc)$, and with both elements 203 and 204 exposed to the same ambient conditions, and with no flow in the channel 301, the potential difference between nodes (b) and (d) is nominally zero; signalling a no-flow, zero, input to the detector circuit 250.

Trim resistors 208 and 209 are provided in the circuit to provide suitable means for calibrating the bridge in such a manner that the zero output signal will be maintained over the static temperature range encountered in use. The resistor 209 corrects for any differences between the thermo-electric responses — the temperature coefficients — of the elements 203 and 204, while the trim potentiometer 208 allows for the correction of unbalances resulting from impedance mismatch of the several components in the bridge.

To provide the desired imbalance in current flow between the two branches of the bridge circuit 200, the total impedance of the branch (adc) is increased by a multiplying factor over the total impedance of the branch (abc); this factor is suitably five, or higher, and advantageously made 10 to 20. It is also advantageous to provide for the impedance adjustments to be made on the high impedance branch of the bridge, as provided for in the embodiment of FIG. 2.

The detector circuit 250 is connected across the nodes (b) and (d) of the bridge circuit 200 and includes an amplifier 213, suitably with a high input impedance and linear gain within the range of output signals derived from the sensing circuitry.

The amplifier is connected in parallel across an adjustable resistor 211, which, in turn, is series connected to the temperature-sensitive element 205 exposed to the static temperature of the flow stream. Since it is desirable to make the output of the amplifier 213 proportional to the mass flow rate of fluid in the channel 301, and since the mass flow rate depends on both the velocity of the jet issuing from nozzle 310 and on the static temperature of the fluid, it is desirable to introduce a component in the detector circuit which is variable in impedance with temperature. This function is performed by the element 205, and fine calibration of its effect on the output signal of the detector circuit 250 is made possible by the inclusion of a variable resistor 210 in parallel with the temperature-sensitive element.

As described above, the output of amplifier 213 is directly proportional to the mass flow in channel 301. This output signal is then compared to a reference signal — representing the desired mass flow rate which is to be maintained in the flow channel — and the resulting error signal amplified, in an output signal generating circuit 280.

The circuit 280 includes an adjustable potentiometer 215 across a suitable source of direct current to generate the reference signal. This reference signal may be displayed on a voltmeter 216 and is fed to one input terminal of an amplifier 217. The output signal of the detector circuit 250, representing the measured mass flow rate in channel 301, may also be displayed in a voltmeter 214 and is fed to the other input terminal of the amplifier 217.

The output of amplifier 217 is fed directly into the servo-motor 118 and secures a rotational displacement of the motor output shaft 126, in a sense appropriate to vary the restriction through the valve 100 by a displacement of ball 124, so that the flow is restored to the preselected mass flow rate.

While the exact nature of the servomotor 118 is immaterial to the overall design of the flow control circuit of FIG. 2, it must be sensitive to the polarity of the output signal of amplifier 217 so that the rotation of shaft 126 will reverse upon a reversal of that polarity. The preferred embodiment of the invention incorporates a servo-motor whose rotational speed varies directly with the magnitude of the input potential, so that a stable control mode may be readily maintained with a gradual approach of the ball 124 to the desired position with respect to the anvil 123.

The flow control valve of the invention and the control circuit associated therewith, and the flow sensor incorporated in the control circuit were described above with reference to their preferred embodiments. Variations in the individual components of the flow control system are possible, and may suggest themselves to one skilled in the art upon exposure to the teachings herein, without deviating from the basic principles of the invention. Such changes — as may be exemplified by the substitution of a hydraulic operator for the servomotor 118, and the provision of controls for that operator responsive to the output signal of amplifier 217 — are deemed to be encompassed by the invention which is delimited only by the appended claims.

I claim:
1. A flow control device for fluids flowing in a closed channel, comprising:
   a valve body adapted to be interposed in said closed channel and pierced by a cylindrical bore forming a portion of the channel;
   a lateral orifice in said valve body, open to one face thereof and terminating in said bore, with the axis of said orifice orthogonal to said bore;
   a cylindrical anvil of smaller diameter than said bore, inserted coaxially thereinto;
   a seal tube of flexible elastomeric material, intermediate between said anvil and said bore and in sealing contact with both;
   retaining means for locating said anvil and said seal tube in said valve body;
   a recess in said anvil, aligned with said lateral orifice;
   orifice means in said anvil, including a first orifice interconnecting said recess with one end of said bore, and a second orifice interconnecting said recess with the other end of the bore; and
   a ball, reciprocable in said lateral orifice, for entraining said seal tube inwardly against said anvil, whereby said seal tube may be distended into said recess and into sealing relationship with respect to said orifice means issuing into said recess, thereby reversibly increasing the restriction in said flow channel.

2. The flow control device of claim 1, wherein said lateral orifice is cylindrical in form.

3. The flow control device of claim 2, wherein said recess is in the form of a right circular cone, whose axis of generation coincides with the central axis of said lateral orifice.

4. The flow control device of claim 1, further comprising servo means for varying the location of said ball in said lateral orifice, in response to a control signal.

5. The flow control device of claim 4, wherein said servo means include a bushing in contact with said ball, with said bushing reciprocably located in guides affixed to said valve body.

6. The flow control device of claim 4, wherein said servo means include an electrically operated, reversible motor, responsive to said signal.

* * * * *